(12) United States Patent  
Dankers et al.

(10) Patent No.: US 11,448,548 B2  
(45) Date of Patent: Sep. 20, 2022

(54) OPTICAL FIBER ASSEMBLY WITH IMPROVED SENSITIVITY

(71) Applicant: Hifi Engineering Inc., Calgary (CA)

(72) Inventors: Arne Dankers, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 27 days.

(21) Appl. No.: 17/053,041

(22) PCT Filed: May 7, 2019

(86) PCT No.: PCT/CA2019/050606  
§ 371 (c)(1),  
(2) Date: Nov. 4, 2020

(87) PCT Pub. No.: WO2019/213759  
PCT Pub. Date: Nov. 14, 2019

(65) Prior Publication Data  
US 2021/0239516 A1    Aug. 5, 2021

Related U.S. Application Data

(60) Provisional application No. 62/668,717, filed on May 8, 2018.

(51) Int. Cl.  
*G01H 9/00*     (2006.01)  
*G01L 1/24*     (2006.01)  
*G02B 6/44*     (2006.01)

(52) U.S. Cl.  
CPC ............. *G01H 9/004* (2013.01); *G01L 1/246* (2013.01); *G02B 6/4459* (2013.01)

(58) Field of Classification Search  
None  
See application file for complete search history.

(56) References Cited

U.S. PATENT DOCUMENTS

| 7,038,190 B2 * | 5/2006 | Udd ................... G01D 5/35383 |
| | | 250/227.11 |
| 7,068,869 B1 * | 6/2006 | Araujo .................... G01L 1/246 |
| | | 385/13 |
| 9,335,482 B2 * | 5/2016 | Hao ....................... G08B 13/124 |

(Continued)

FOREIGN PATENT DOCUMENTS

| CN | 105971647 B1 | 9/2016 |
| EP | 1816432 B1 | 11/2008 |

(Continued)

*Primary Examiner* — Brandi N Hopkins  
*Assistant Examiner* — Nigel H Plumb  
(74) *Attorney, Agent, or Firm* — D'Ambrosio & Menon, PLLC; Usha Menon (57) ABSTRACT

An optical fiber assembly comprising an optical fiber casing and optical fiber deployed within and fixed relative to the casing at multiple fixation points spaced along the casing. The optical fiber assembly includes one or more weights attached within the casing to the optical fiber, for increasing a tension of the optical fiber between the multiple fixation points; flexible portions and rigid portions, with the optical fiber fixed to the flexible portions; and/or at least one guide member positioned at at least one of the fixation points and configured to constrain a bend radius of the optical fiber.

15 Claims, 8 Drawing Sheets

(56) References Cited

U.S. PATENT DOCUMENTS

| | | | | |
|---|---|---|---|---|
| 2006/0285813 A1* | 12/2006 | Ferguson | ............... | G01B 11/16 |
| | | | | 385/138 |
| 2007/0193362 A1* | 8/2007 | Ferguson | ............. | G01B 11/165 |
| | | | | 73/800 |

FOREIGN PATENT DOCUMENTS

| | | | |
|---|---|---|---|
| WO | 2012150910 | A1 | 11/2012 |
| WO | 2013102252 | A1 | 11/2013 |

* cited by examiner

OPTICAL FIBER ASSEMBLY WITH IMPROVED SENSITIVITY

FIELD OF THE DISCLOSURE

The present disclosure relates to an optical fiber assembly, to a method of forming an optical fiber assembly, and to a system incorporating an optical fiber assembly.

BACKGROUND TO THE DISCLOSURE

Fiber optic cables are often used for distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may be, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

There is a persistent need in the art for the sensitivity of such optical fiber sensors to be improved. The present disclosure seeks to provide such an improvement.

SUMMARY OF THE DISCLOSURE

In a first aspect of the disclosure, there is provided an optical fiber assembly comprising an optical fiber casing and optical fiber deployed within and fixed relative to the casing at multiple fixation points spaced along the casing. The optical fiber may therefore extend alternately from one side of the casing's interior to the other side of the casing's interior. The length of optical fiber within the optical fiber casing may therefore resemble a saw-tooth wave (see FIG. 6). Between consecutive fixation points, the optical fiber may be substantially taut so that its sensitivity to acoustics may be improved.

The optical fiber assembly may further comprise one or more weights attached within the casing to the optical fiber.

The optical fiber casing may comprise one or more rigid portions and one or more flexible portions. The one or more rigid portions may comprise acrylic. The one or more flexible portions may comprise vinyl.

Along a length of the optical fiber casing, the casing may alternate between the one or more rigid portions and the one or more flexible portions.

At least one of the multiple fixation points may be located at the one or more flexible portions. Thus, the optical fiber may be attached to the casing at at least one of the one or more flexible portions.

At least one of the one or more weights may be attached to the optical fiber at a point where the optical fiber is deployed within at least one of the one or more rigid portions.

The optical fiber may be adhered to the optical fiber casing.

Each weight may comprise a mass selected so as to increase a tension of the optical fiber between the multiple fixation points. The one or more weights may therefore increase a tension of the optical fiber beyond that which the optical fiber would exhibit without the one or more weights.

At least one of the one or more weights may be threaded onto the optical fiber.

The optical fiber may be attached to the optical fiber casing at the multiple fixation points. The one or more weights may be attached to the optical fiber at one or more points located between the multiple fixation points.

Each of the rigid portions and each of the flexible portions may be tubular. A diameter of at least one of the one or more rigid portions may be greater than a diameter of at least one of the one or more flexible portions.

At least one of the one or more rigid portions may be longer than at least one of the one or more flexible portions.

At least one guide member may be positioned at at least one of the fixation points and may be configured to constrain a bend radius of the optical fiber.

In a further aspect of the disclosure, there is provided a method of forming an optical fiber assembly. The method comprises deploying optical fiber within an optical fiber casing, and fixing the optical fiber relative to the casing at multiple fixation points spaced long the casing. The method may further comprise attaching one or more weights to the optical fiber.

The optical fiber assembly may comprise any of the features described above in connection with the first aspect of the disclosure.

In a further aspect of the disclosure, there is provided a kit of parts. The kit comprises an optical fiber casing, optical fiber, and instructions. The instructions are for deploying the optical fiber within the casing, and for fixing the optical fiber relative to the casing at multiple fixation points spaced long the casing.

The optical fiber assembly may comprise any of the features described above in connection with the first aspect of the disclosure.

In a further aspect of the disclosure, there is provided a system comprising: a first conduit; an optical fiber assembly positioned alongside the conduit; and an optical fiber interrogator optically coupled to the optical fiber of the assembly and configured to interrogate the optical fiber by transmitting light along the optical fiber and receiving reflections of the transmitted light. The optical fiber assembly may be an assembly as per any of the above-described optical fiber assemblies.

The first conduit may comprise a pipeline or a wellbore.

The optical fiber assembly may be housed in a second conduit.

In a further aspect of the disclosure, there is provided an optical fiber assembly comprising: an optical fiber casing; and optical fiber deployed within and fixed relative to the casing at multiple fixation spaced points along the casing. The optical fiber casing may comprise one or more rigid portions and one or more flexible portions.

The optical fiber assembly may comprise any of the features described above in connection with the first aspect of the disclosure.

BRIEF DESCRIPTION OF THE DRAWINGS

Embodiments of the disclosure will now be described in detail in conjunction with the accompanying drawings of which.

DETAILED DESCRIPTION OF EMBODIMENTS

The present disclosure seeks to provide an improved optical fiber assembly. While various embodiments of the disclosure are described below, the disclosure is not limited to these embodiments, and variations of these embodiments may well fall within the scope of the disclosure which is to be limited only by the appended claims.

As used herein, a reference to "about" or "approximately" a number or to being "substantially" equal to a number means being within +1-10% of that number.

Figure 1A:
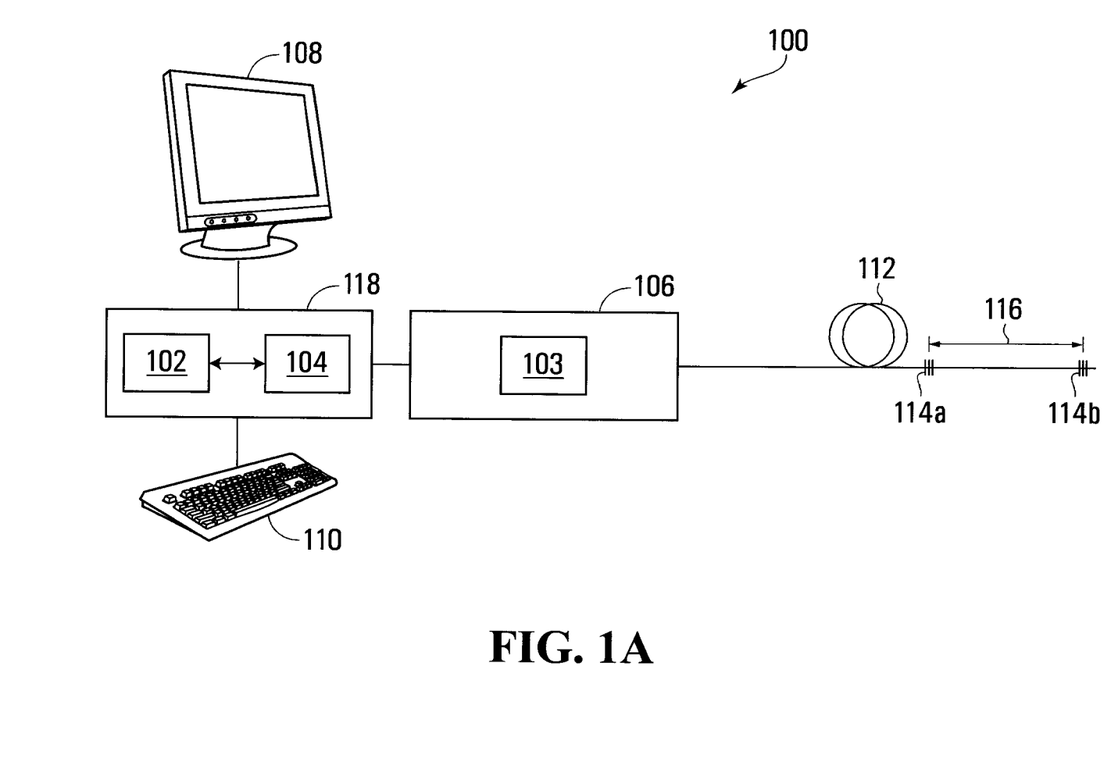
FIG. 1A is a block diagram of a system for determining whether an event has occurred from dynamic strain measurements, which includes an optical fiber with fiber Bragg gratings ("FBGs") for reflecting a light pulse, in accordance with an embodiment of the disclosure.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous SiO2). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
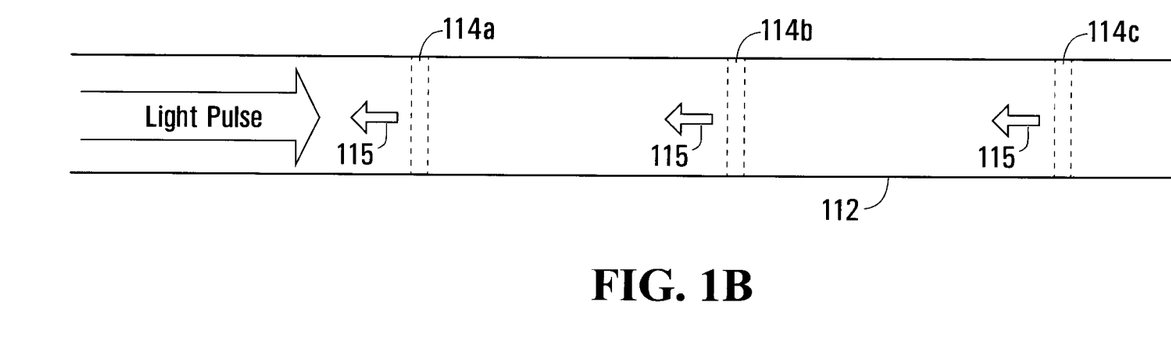
FIG. 1B is a schematic diagram that depicts how the FBGs reflect a light pulse.

FIG. 1B depicts how the FBGs 114 reflect the light pulse, according to another embodiment in which the optical fiber 112 comprises a third FBG 114*c*. In FIG. 1B, the second FBG 114*b* is equidistant from each of the first and third FBGs 114*a,c* when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114*a,b* can reflect off the third FBG 114*c* and any subsequent FBGs 114, resulting in interferometry that can be used to detect strain along the fiber 112 occurring further from the interrogator 106 than the second FBG 114*b*. For example, in the embodiment of FIG. 1B, a portion of the sensing pulse not reflected by the first and second FBGs 114*a,b* can reflect off the third FBG 114*c*, and a portion of the reference pulse not reflected by the first FBG 114*a* can reflect off the second FBG 114*b*, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\theta = 2\pi nL/\lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

Figure 1C:
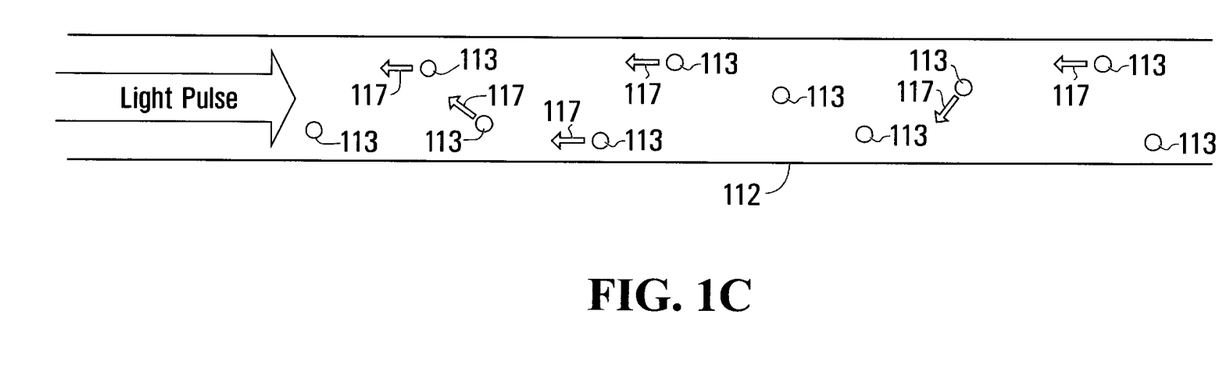
FIG. 1C is a schematic diagram that depicts how a light pulse interacts with impurities in an optical fiber that results in scattered laser light due to Rayleigh scattering, which is used for distributed acoustic sensing ("DAS")

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
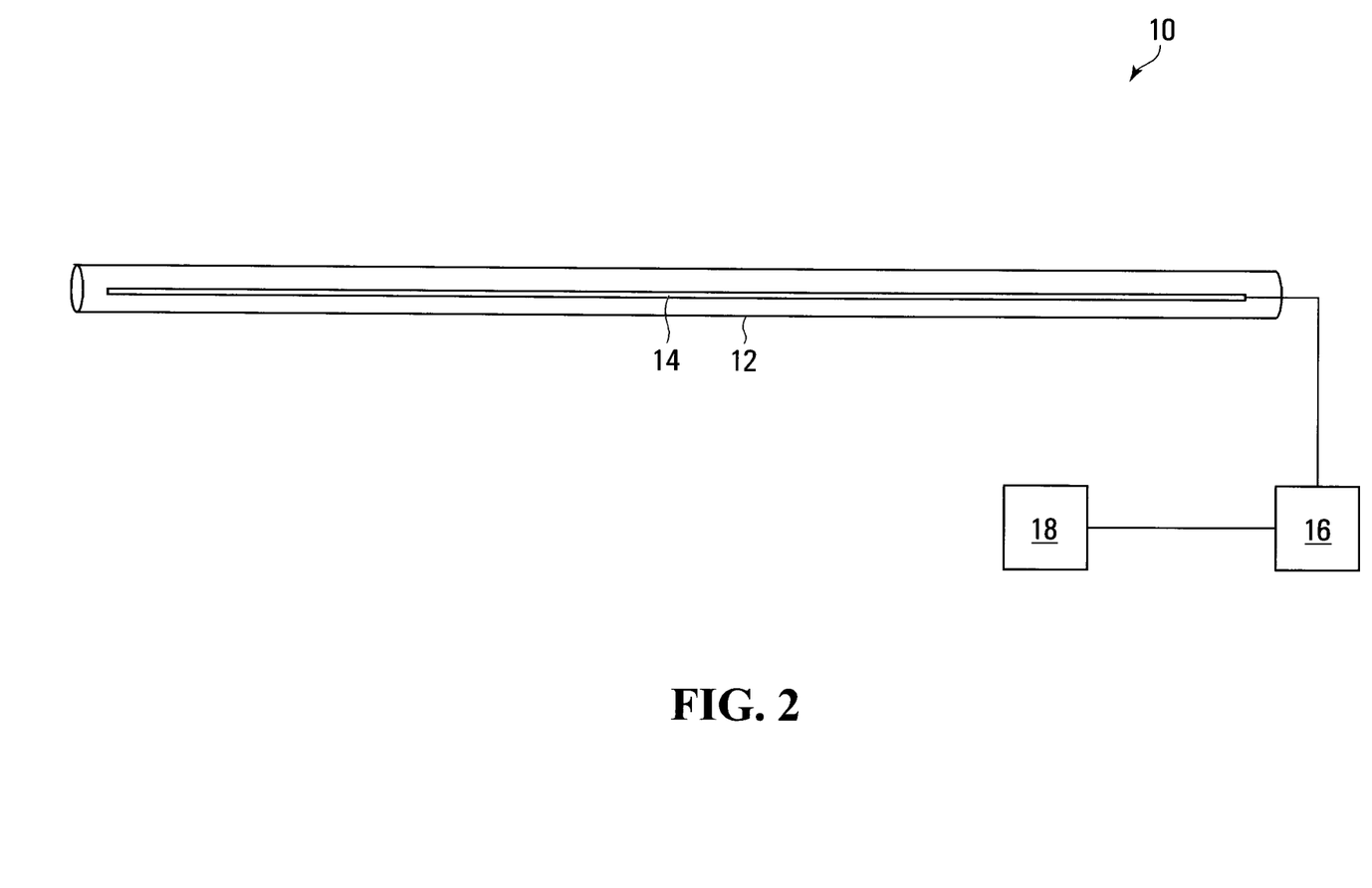
FIG. 2 is a schematic diagram of an optical interrogation system in accordance with an embodiment of the disclosure.

Referring now to FIG. 2, there is shown an optical interrogation system 10 that may be used, for example, to detect events in a pipeline. FIG. 2 shows a pipeline 12 alongside which is provided a length of optical fiber assembly 14. In some embodiments, optical fiber assembly 14 may comprise multiple individual interconnected optical fiber assemblies. In some embodiments, optical fiber assembly 14 is attached to pipeline 12, whereas in other embodiments optical fiber assembly 14 may be positioned within acoustic proximity of pipeline 12, meaning that optical fiber assembly 14 is sufficiently close to pipeline 12 so as to detect acoustic energy originating from pipeline 12.

Optical fiber assembly 14 is optically coupled to an interrogator 16. Interrogator 16 is configured to interrogate optical fiber assembly 14 using optical fiber interferometry, as described above. Interrogator 16 is communicatively coupled to a control module 18. Control module 18 comprises one or more processors and one or more memories comprising computer program code executable by the one or more processors and configured, when executed by the one or more processors, to cause the one or more processors to process phase data obtained by interrogator 16 from interferences between light pulses transmitted along optical fiber assembly 14. In some embodiments, control module 18 may be comprised within interrogator 16 such that interrogator 16 may perform the functions of control module 18.

Figure 3:
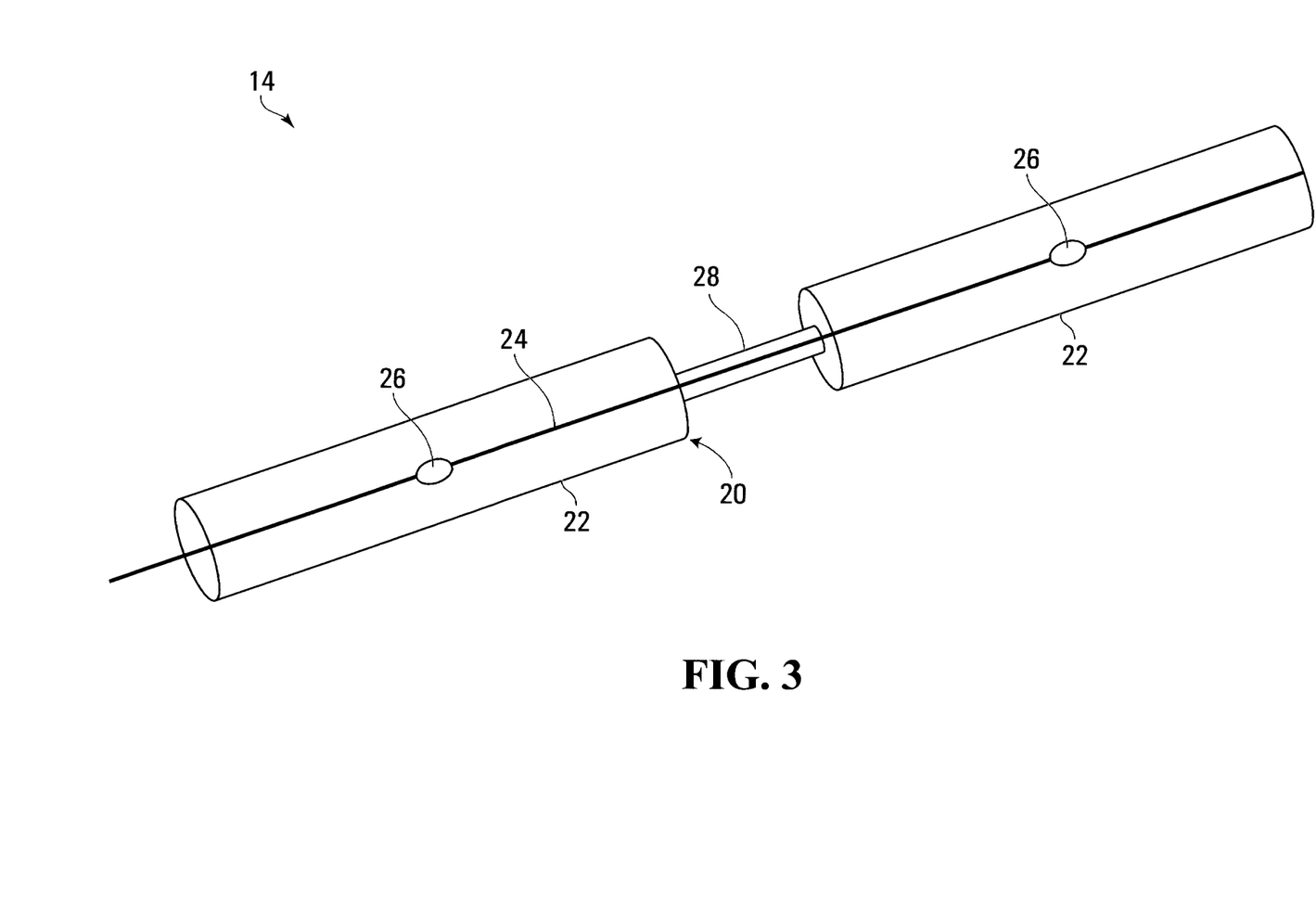
FIG. 3 is a schematic diagram of an optical fiber assembly, in accordance with an embodiment of the disclosure.

Turning now to FIG. 3, there is shown a schematic diagram of optical fiber assembly 14 in more detail, in accordance with an embodiment of the disclosure. Optical fiber assembly 14 comprises an optical fiber casing 20 which includes multiple tubular flexible portions 28 (one of which is shown in FIG. 3) alternating with multiple tubular and relatively longer rigid portions 22. Each flexible portion is formed of a suitably flexible material such as vinyl, although other materials may be used. Each rigid portion is formed of a suitably rigid material such as acrylic, although other materials may be used. Within the context of this disclosure, "rigid" and "flexible" are to be understood in a relative sense, meaning that a flexible portion 28 is more flexible, or less rigid, than a rigid portion 22, and vice versa.

Optical fiber casing 20 encloses within it an optical fiber 24. In other words, optical fiber 24 is deployed within optical fiber casing 20, and in particular within the alternating flexible portions 28 and rigid portions 22 forming optical fiber casing 20. Optical fiber 24 is attached to optical fiber casing 20 at each of the flexible portions 28, for example using an adhesive. Alternatively, optical fiber 24 could be fixed relative to flexible portions 28 using a friction fit/compression fit, or through shrink wrapping. For instance, an internal diameter of each flexible portion 28 may be approximately equal to an external diameter of optical fiber 24 such that optical fiber 24 is held in place relative to the flexible portions 28 via a friction fit. In other embodiments, optical fiber 24 may be attached to optical fiber casing 20 at other points, for example at one or more of rigid portions 22.

Weights 26 are attached to optical fiber 24 at regular intervals. For example, in some embodiments each weight 26 comprises a central bore through which is threaded optical fiber 24, and once optical fiber 24 is threaded through a weight 26, the weight 26 is attached to optical fiber 24 using suitable means, for example by using an adhesive, through a friction fit or by shrink wrapping. The position of each weight 26 is such that each weight 26 is enclosed or deployed within a corresponding rigid portion 22 of optical fiber casing 20. In the embodiment of FIG. 3, each weight 26 is positioned roughly equidistant from ends of a corresponding one of rigid portions 22, although in other embodiments weights 26 may be positioned at other points within a corresponding rigid portion 22 and/or a flexible portion 28.

Figure 4:
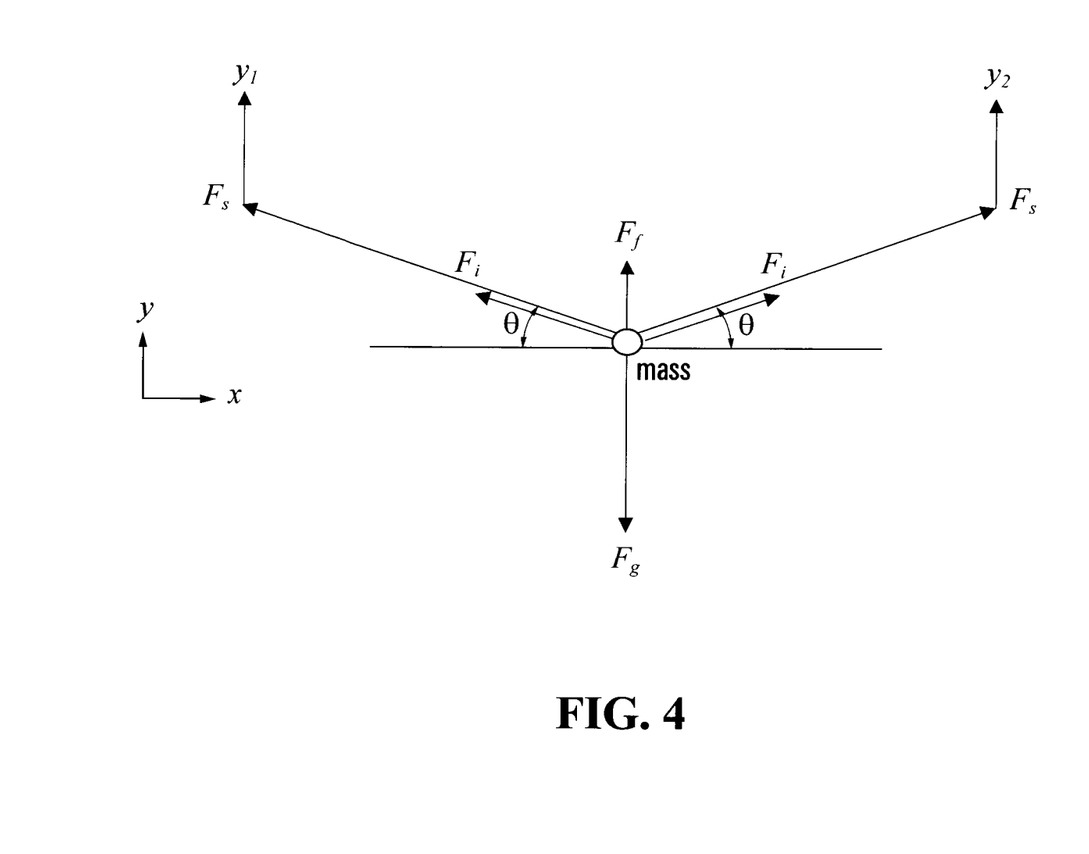
FIG. 4 is a force diagram of a mass suspended from a string.

Each weight 26 has a mass selected so as to increase a tension of optical fiber 24 between the points at which optical fiber 24 is attached to optical fiber casing 20. The effect of weight 26 on optical fiber 24 can be visualized in FIG. 4. As can be seen in FIG. 4, the mass m of weight 26 can be modelled as a mass on a string. $F_g$ is the force exerted on weight 26 due to gravity, $F_s$ is the force exerted on weight 26 due to the tension of optical fiber 24, $F_f$ is the damping force due to motion of optical fiber 24 and weight 26 through the air, $F_i$ is the damping force due to internal elastic properties of optical fiber 24, and $y_1$ and $y_2$ are displacements acting on optical fiber 24 (due for example to external forces and vibrations).

Figure 5:
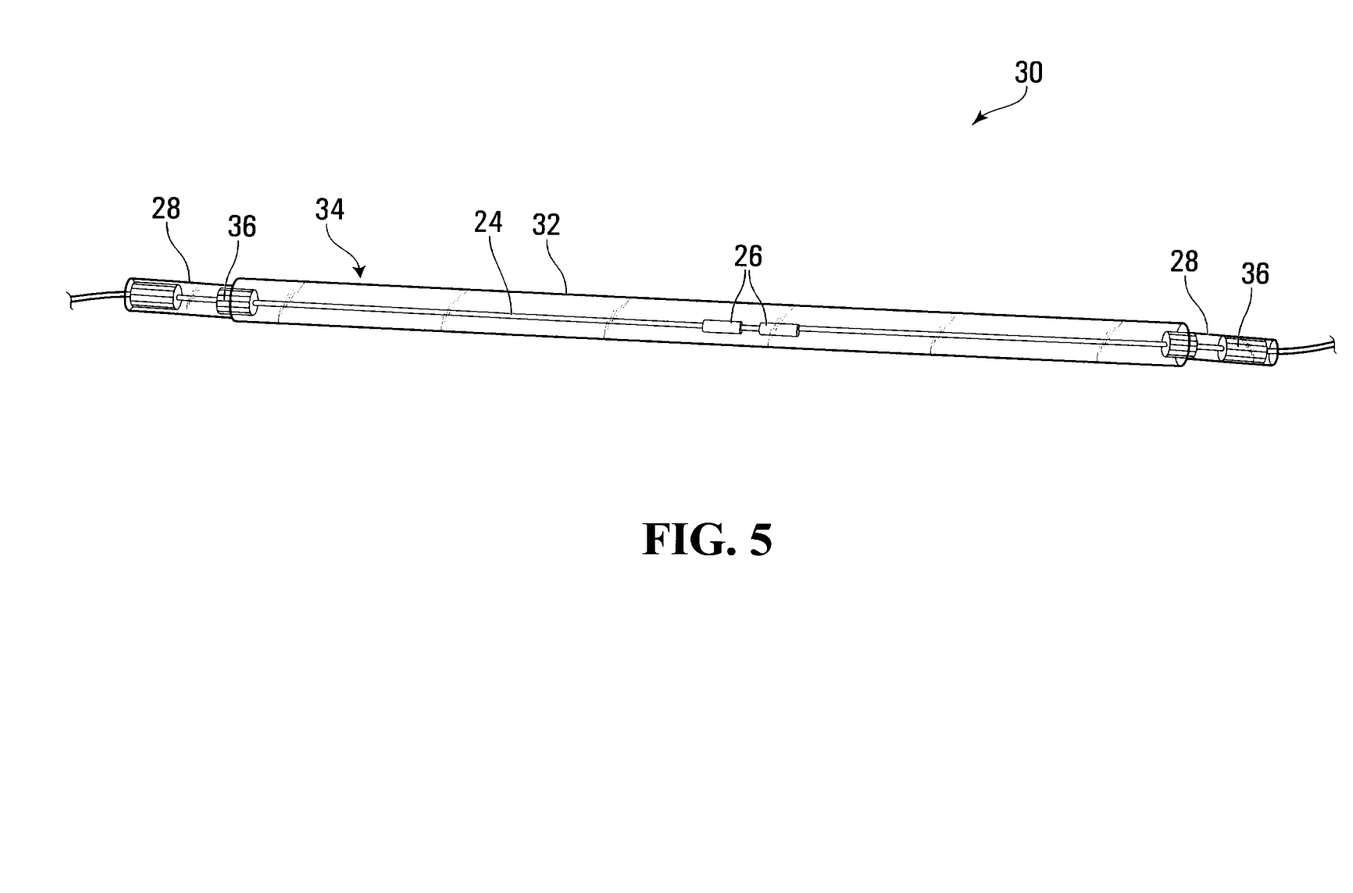
FIG. 5 shows an optical fiber assembly, in accordance with an embodiment of the disclosure.

Turning to FIG. 5, there is shown an optical fiber assembly 30 in accordance with another embodiment of the disclosure. Optical fiber assembly 30 comprises an optical fiber casing 34 formed of rigid portions 32 (only one of which is shown in FIG. 5) alternating with flexible portions 28. An optical fiber 24 is deployed within optical fiber casing 34. In this case, optical fiber 24 has two weights 26 attached thereto, approximately equidistant from ends of rigid portion 32 within which optical fiber 24 is deployed. Optical fiber 24 is attached to optical fiber casing 34 at flexible portions 28, for example by using an adhesive, through a friction fit or by shrink wrapping.

Compression elements 36 comprise foam that are used to assist in fix/attach optical fiber 24 to flexible portions 28, and to assist in attaching flexible portions 28 to rigid portions 32. In particular, compression elements 36 are positioned between flexible portions 28 and rigid portions 32, and glued to both. Compression elements 36 therefore act as compression fittings for attaching flexible portions 28 to rigid portions 32. Furthermore, compression elements 36 are positioned at ends of flexible portions 28, on the interior of flexible portions 28. Thus, compression elements 36 act as compression fittings for attaching optical fiber 24 to flexible portions 28. In alternative embodiments, other means of attaching flexible portions 28 to rigid portions 32 may be used. For example, in the case where the flexible portions 28 have different diameters to the rigid portions 32, adapters may be used to fit flexible portions 28 to rigid portions 32.

In order to deploy the optical fiber within the optical fiber casing, the following operations may be performed. The actual order and number of the operations may vary from one embodiment to the next.

The weights are first attached to the optical fiber. For example, each weight may be threaded onto the optical fiber following which each weight may be fixed to the optical fiber, for example by using an appropriate adhesive. The optical fiber is then deployed within the optical fiber casing, by inserting the optical fiber into an open end of the optical fiber casing. Once deployed within the optical fiber casing, the optical fiber is attached to the optical fiber casing at predetermined locations. For example, in the case of FIG. 3 the optical fiber is attached to the optical fiber casing at the flexible portions 28.

With the weights attached to the optical fiber, the optical fiber is put under increased tension, resulting in increased sensitivity. In particular, since the optical fiber is under tension it is more responsive to vibrations and acoustic waves in the environment.

Figure 6:
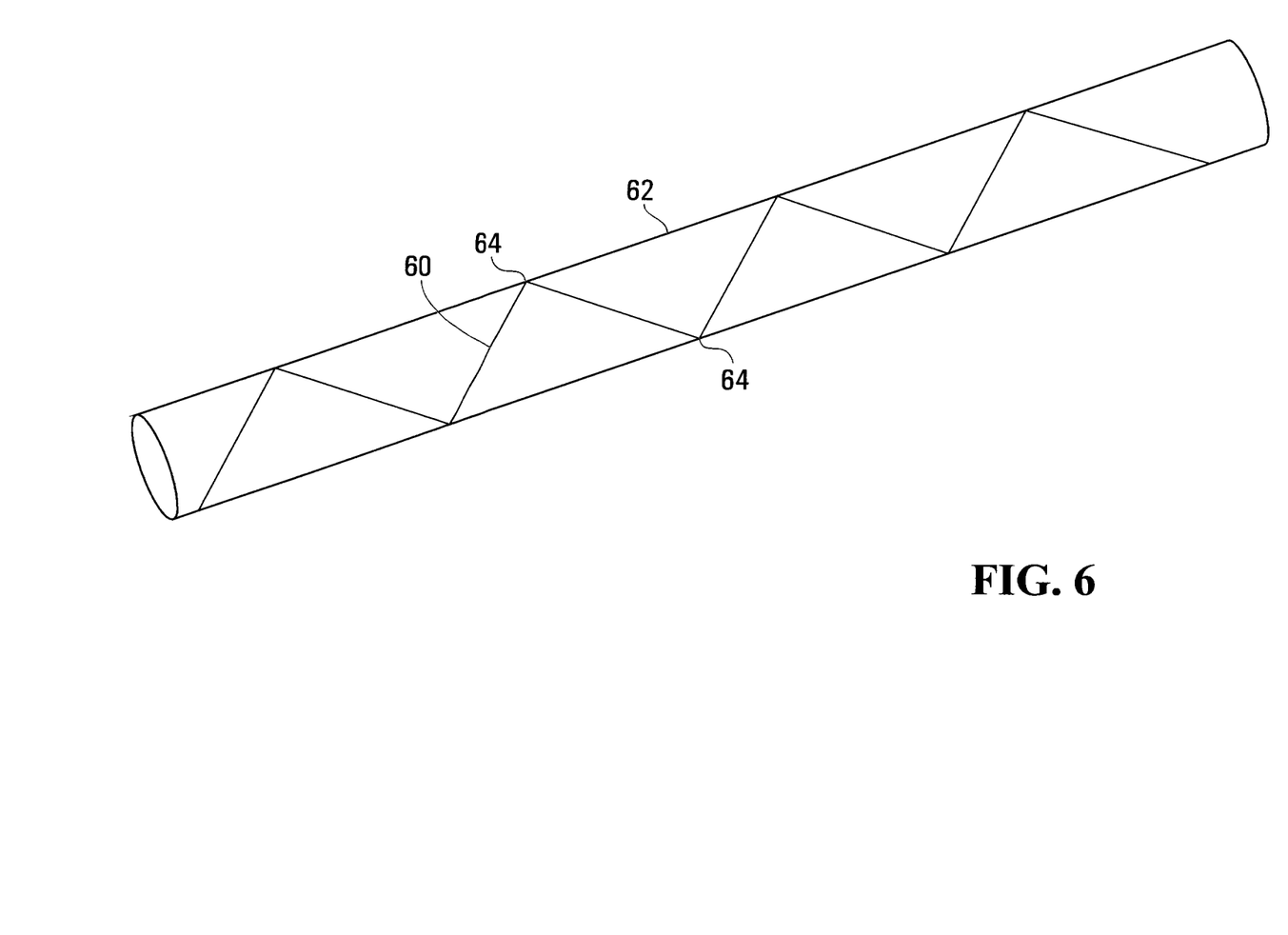
FIG. 6 is a schematic diagram of an optical fiber assembly, in accordance with another embodiment of the disclosure.

FIG. 6 shows another embodiment of an optical fiber assembly. The assembly comprises an optical fiber casing 62 with optical fiber 60 deployed therein. In this embodiment, optical fiber casing 62 does not comprise any flexible portions, and instead may be relatively rigid. Optical fiber 60 is fixed relative to the casing at multiple fixation points 64 spaced along the casing. For example, optical fiber 60 may be glued to fixation points 64, or else may pass through a hook or a loop (not shown) at each fixation point 64, following which optical fiber 60 is pulled taught. The manner of fixation is not critical, provided that the tautness of optical fiber 60 may be increased (as compared to an assembly in which the optical fiber is not fixed to the casing at multiple fixation points) by virtue of optical fiber 60 being held taut between successive fixation points 64.

Figure 7:
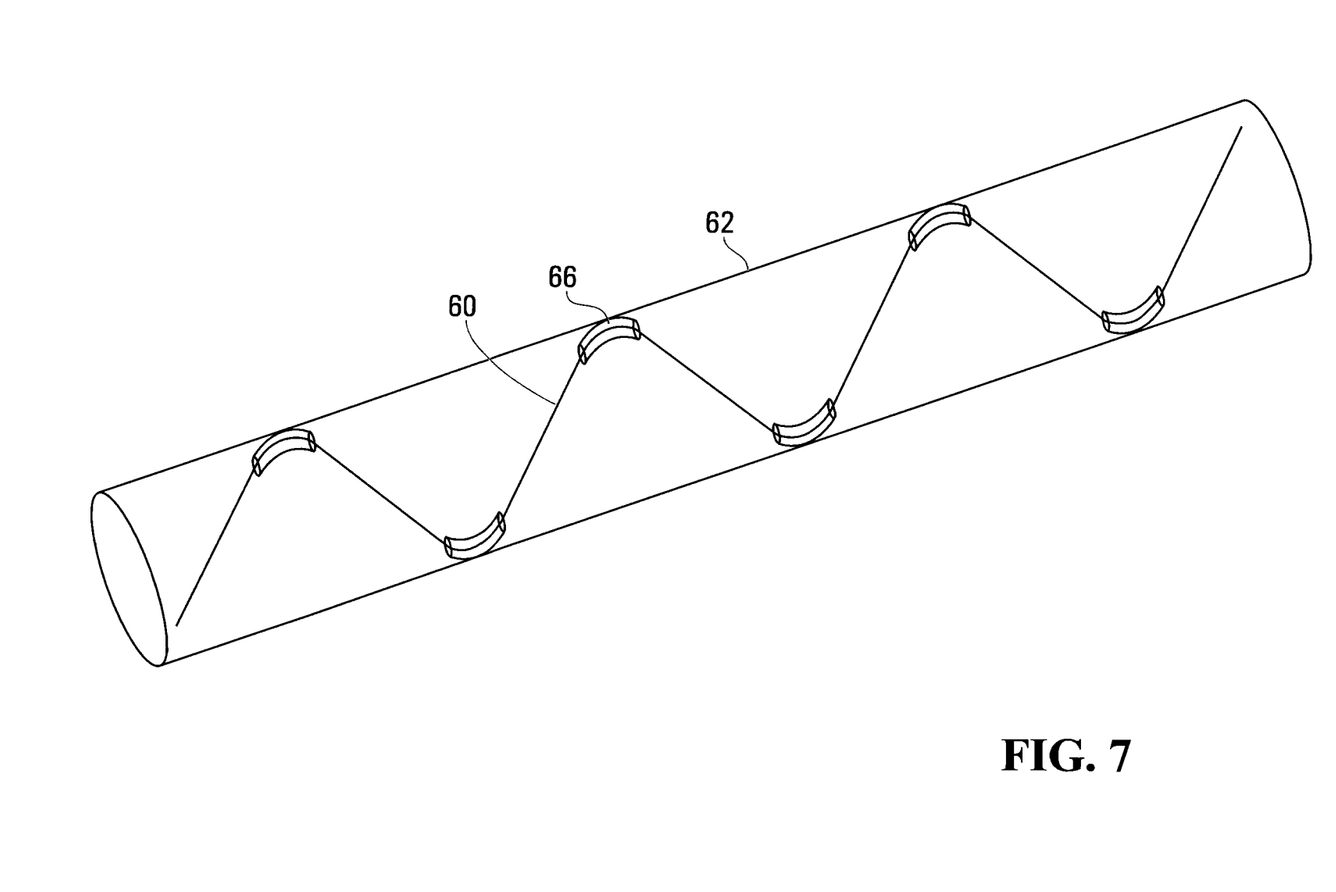
FIG. 7 is a schematic diagram of an optical fiber assembly, in accordance with another embodiment of the disclosure.

FIG. 7 shows another embodiment of an optical fiber assembly, similar to the assembly of FIG. 6. In this embodiment, the assembly includes a number of guides 66 through which optical fiber 60 passes at each fixation point. Guides 66 are affixed to the interior surface of optical fiber casing 62 and may comprise curved plastic tubes configured to guide optical fiber 62 in such a way that the fiber's minimum bend radius rating is respected. Other types of guides are contemplated provided that the fiber's minimum bend radius rating is respected.

While the disclosure has been described in connection with specific embodiments, it is to be understood that the disclosure is not limited to these embodiments, and that alterations, modifications, and variations of these embodiments may be carried out by the skilled person without departing from the scope of the disclosure. For example, while in the embodiment of FIG. 3 the diameter of rigid portions 22 is greater than that of flexible portions 28, in other embodiments the relative diameters of rigid portions 22 and flexible portions 28 could be reversed.

It is furthermore contemplated that any part of any aspect or embodiment discussed in this specification can be implemented or combined with any part of any other aspect or embodiment discussed in this specification.

The invention claimed is:

1. An optical fiber assembly comprising:
an optical fiber casing;
optical fiber deployed within and fixed relative to the casing at multiple fixation points spaced along the casing; and
one or more weights attached within the casing to the optical fiber.

2. The optical fiber assembly of claim 1, wherein the optical fiber is adhered to the optical fiber casing.

3. The optical fiber assembly of claim 1, wherein each of the one or more weights comprises a mass selected so as to increase a tension of the optical fiber between the multiple fixation points.

4. The optical fiber assembly of claim 1, wherein at least one of the one or more weights is threaded onto the optical fiber.

5. The optical fiber assembly of claim 1, wherein the optical fiber is attached to the optical fiber casing at the multiple fixation points.

6. The optical fiber assembly of claim 1, wherein the one or more weights are attached to the optical fiber at one or more points located between the multiple fixation points.

7. An optical fiber assembly comprising:
an optical fiber casing, wherein the optical fiber casing comprises one or more rigid portions and one or more flexible portions; and
optical fiber deployed within and fixed relative to the casing at multiple fixation points spaced along the casing.

8. The optical fiber assembly of claim 7, wherein the one or more rigid portions comprise acrylic.

9. The optical fiber assembly of claim 7, wherein the one or more flexible portions comprise vinyl.

10. The optical fiber assembly of claim 7, wherein along a length of the optical fiber casing the casing alternates between the one or more rigid portions and the one or more flexible portions.

11. The optical fiber assembly of claim 7, wherein at least one of the multiple fixation points is located at the one or more flexible portions.

12. The optical fiber assembly of claim 7, further comprising one or more weights attached within the casing to the optical fiber, wherein at least one of the one or more weights is attached to the optical fiber at a point where the optical fiber is deployed within at least one of the one or more rigid portions.

13. The optical fiber assembly of claim 7, wherein each of the rigid portions and each of the flexible portions is tubular, and wherein a diameter of at least one of the one or more rigid portions is greater than a diameter of at least one of the one or more flexible portions.

14. The optical fiber assembly of claim 7, wherein at least one of the one or more rigid portions is longer than at least one of the one or more flexible portions.

15. An optical fiber assembly comprising:
an optical fiber casing;
optical fiber deployed within and fixed relative to the casing at multiple fixation points spaced along the casing; and
at least one guide member positioned at at least one of the fixation points and configured to constrain a bend radius of the optical fiber.

* * * * *